United States Patent
McHugh et al.

(10) Patent No.: US 11,514,173 B2
(45) Date of Patent: Nov. 29, 2022

(54) PREDICTING SOFTWARE SECURITY EXPLOITS BY MONITORING SOFTWARE EVENTS

(71) Applicant: International Business Machines Corporation, Armonk, NY (US)

(72) Inventors: Manus Kevin McHugh, Colorado Springs, CO (US); Kirk M. Woods, Lathrop, MO (US); Schuyler Bruce Matthews, Cary, NC (US); Lee Thomas, Bend, OR (US)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 17/109,247

(22) Filed: Dec. 2, 2020

(65) Prior Publication Data

US 2022/0171857 A1 Jun. 2, 2022

(51) Int. Cl.
| | | |
|---|---|---|
| *G06F 21/00* | (2013.01) | |
| *G06F 21/57* | (2013.01) | |
| *G06F 21/55* | (2013.01) | |
| *G06F 21/52* | (2013.01) | |

(52) U.S. Cl.
CPC ............ *G06F 21/577* (2013.01); *G06F 21/52* (2013.01); *G06F 21/554* (2013.01); *G06F 2221/033* (2013.01)

(58) Field of Classification Search
CPC ...... G06F 21/577; G06F 21/52; G06F 21/554; G06F 2221/033
See application file for complete search history.

(56) References Cited

U.S. PATENT DOCUMENTS

| | | |
|---|---|---|
| 7,853,468 B2 | 12/2010 | Callahan |
| 9,250,884 B2 | 2/2016 | Ravi |
| 10,042,697 B2 | 8/2018 | Ahad |

(Continued)

FOREIGN PATENT DOCUMENTS

| | | |
|---|---|---|
| CA | 2819832 C | 6/2012 |
| CN | 103581186 B | 2/2014 |

(Continued)

OTHER PUBLICATIONS

"Artificial intelligence for a smarter kind of cybersecurity", IBM, retrieved from the Internet on Sep. 11, 2020, 6 pages.
"Veclia issued five U.S patents for artificial intelligence that automates the hunt for cyber attacker behaviors", Vectra AI, Aug. 15, 2017, 3 pages.
Brockmeyer, Dr. Udo, "Blog Model-Based Testing: how does it support Model-Based Systems Engineering?", Published on Jan. 10, 2016, 2 pages.

(Continued)

*Primary Examiner* — Ghazal B Shehni
(74) *Attorney, Agent, or Firm* — Donald G. Weiss; Alexander G. Jochym (57) ABSTRACT

In an approach to predicting software security exploits by monitoring software events, sets of design events are received from a compliance monitor, where the sets of design events are captured by the compliance monitor during execution of a software application. A pattern of the sets of design events performed by the software application is detected, where the pattern is a specific sequence of the sets of design events. The pattern of the sets of design events performed by the software application is compared to a database of learned patterns using a deep learning model. A security exploit is predicted based on the comparison of the pattern of the sets of design events performed by the software application to the learned patterns.

20 Claims, 8 Drawing Sheets

(56) References Cited

U.S. PATENT DOCUMENTS

| | | | |
|---|---|---|---|
| 10,397,258 B2 | 8/2019 | Luo | |
| 10,503,902 B2 | 12/2019 | Chen | |
| 2008/0270207 A1 | 10/2008 | Santos | |
| 2012/0117117 A1* | 5/2012 | Barnea | G06Q 10/067 |
| | | | 707/E17.055 |
| 2014/0215621 A1 | 7/2014 | Xaypanya | |
| 2017/0214701 A1 | 7/2017 | Hasan | |
| 2018/0053088 A1* | 2/2018 | Chakraborty | G06N 3/0445 |
| 2018/0219887 A1 | 8/2018 | Luo | |
| 2018/0260562 A1 | 9/2018 | Chen | |
| 2019/0260779 A1 | 8/2019 | Bazalgette | |
| 2020/0120110 A1* | 4/2020 | Stokes, III | G06N 3/0445 |
| 2020/0242001 A1 | 7/2020 | McHugh | |
| 2020/0406147 A1* | 12/2020 | Gauffin | A63F 13/35 |

FOREIGN PATENT DOCUMENTS

| | | |
|---|---|---|
| CN | 107256357 B | 10/2017 |
| JP | 2018521430 A | 8/2018 |

OTHER PUBLICATIONS

Chupilko et al., "Runtime Verification Based on Executable Models: On-the-Fly Matching of Timed Traces", Eighth Workshop on Model-Based Testing (MBT 2013) EPTCS 111, 2013, pp. 67-81, doi:10.4204/EPTCS.111.6.

Hansen et al., "Automated Verification of Executable UML Models", Conference Paper, Nov. 2010, DOI: 10.1007/978-3-642-25271-6_12, Source: DBLP, 27 pages.

Planas et al., "Lightweight Verification of Executable Models", Published in ER 2011, Computer Science, 11 pages, DOI:10.1007/978-3-642-24606-7_37.

Shar et al., "Web Application Vulnerability Prediction Using Hybrid Program Analysis and Machine Learning," IEEE Transactions on Dependable and Secure Computing vol. 12, No. 6, Nov./Dec. 2015, pp. 688-707.

* cited by examiner

PREDICTING SOFTWARE SECURITY EXPLOITS BY MONITORING SOFTWARE EVENTS

BACKGROUND

The present invention relates generally to the field of computer security, and more particularly to predicting software security exploits by monitoring software events.

Computer security, cybersecurity, or information technology security is the protection of computer systems and networks from the theft of or damage to their hardware, software, or electronic data, as well as from the disruption or misdirection of the services they provide.

It is likely that every piece of software currently deployed, or that will ever be deployed, will have vulnerabilities cybercriminals can find and exploit. An exploit is a piece of software or a sequence of commands that takes advantage of a bug or vulnerability to cause unintended or unanticipated behavior to occur on computer software. These vulnerabilities are hidden in the code of operating systems and applications just waiting to be discovered and put to use by cybercriminals. Such behavior frequently includes things like gaining control of a computer system, allowing privilege escalation, or a Denial-of-Service attack.

A vulnerability is a weakness in design, implementation, operation, or internal control. An exploitable vulnerability is one for which at least one working attack or "exploit" exists. Vulnerabilities can be researched, reverse-engineered, hunted, or exploited using automated tools or customized scripts. To secure a computer system, it is important to understand the attacks that can be made against it. Vulnerability management is the cycle of identifying, and remediating or mitigating vulnerabilities, especially in software and firmware.

SUMMARY

Embodiments of the present invention disclose a method, a computer program product, and a system for predicting software security exploits by monitoring software events. In one embodiment, sets of design events are received from a compliance monitor, where the sets of design events are captured by the compliance monitor during execution of a software application. A pattern of the sets of design events performed by the software application is detected, where the pattern is a specific sequence of the sets of design events. The pattern of the sets of design events performed by the software application is compared to a database of learned patterns using a deep learning model. A security exploit is predicted based on the comparison of the pattern of the sets of design events performed by the software application to the learned patterns.

DETAILED DESCRIPTION

Many security exploits are the results of vulnerabilities in executing software that are the result of malicious changes to the code by cybercriminals. But when software executes as designed, there is no violation to be flagged to operators. Logging cannot be depended upon to provide accurate execution information. A compliance monitor which observes design sequences cannot detect "design compliant" exploits. Network logs, user activity logs, database logs, security forensic findings, etc., cannot take advantage of design sequence data. Additionally, these data streams are too large, and events too widely separated to identify and predict exploits using traditional algorithmic approaches.

The present invention combines new, live, internal software state changes from a compliance monitor and existing data, such as operations, security, etc., to identify and predict security exploits earlier and more accurately than currently possible. The present invention does this using both supervised and unsupervised Artificial Intelligence (AI) algorithms. This is accomplished by correlating design sequence events with data such as detection of Structured Query Language (SQL) injections, database logs, usernames, etc. The correlation can be found in test results where security testing has been performed, with the design sequences being captured simultaneously.

By learning the sets of design events that lead to security exploits and the sets that do not, the present invention can identify security exploits further in advance than existing techniques. The present invention requests human intervention earlier than existing techniques (i.e., before the security exploit is reached). The invention also notifies the operational software of a predicted security exploit.

The present invention improves over the current art log analysis in that logs do not have correlated design information, logs do not have a coherent execution sequence(s) identified, and logs are prone to error or spoofing, misleading the analysis.

The present invention monitors events during security testing of the software as it is developed. This generates both positive (no adverse security exploits) and negative (containing adverse security exploits) input. That data is used to train the deep learning model. For training, security tests are executed while software events are logged. The event sequences are input to the deep learning model. For operational software, the same inputs are delivered to the deep learning model. The model then determines new patterns that predict security exploits.

For any given application, the deep learning model is trained on security testing results that include design data, then continuously monitors and learns from live data streams of software events and security events, and provides notifications of future security exploits, including the probability of the future security exploits occurring, based on the training and the ongoing learning. Notifications from the deep learning model are provided both to human operators and also to the operational software itself. Probabilities vary over time due to the ongoing learning.

Recurrent Neural Networks (RNNs) is the area of deep learning that is concerned with learning in an unsupervised manner, i.e., where humans do not label the data during training. Several choices of algorithm could be combined with an RNN to permit the RNN to process and respond to time-based sequences of events. One example is the Hidden Markov Model, which maintains a state for the system being understood, and transitions from one state to another based on each new input, refining the probability that the system is in a particular state based on new inputs. Another example algorithm for RNNs is the Connectionist Temporal Classification. The training data is labeled in that a sequence of software events precedes a passing or failing security test, so in that sense the training is supervised. However, a particular security exploit could be preceded by various sequences of software events, the sub-sequences of events are not labeled, and therefore in that sense the data is unlabeled. The present invention expects the RNN to discover new sequences and/or subsequences that predict security exploits, with various probabilities of certainty.

In addition to both compliant and non-compliant internal software state sequences from a compliance monitor, and detected security exploits, additional events may include, but are not limited to, system events, operator events and other AI sources. Also, the deep learning model can learn from one or more set of systems, i.e., the deep learning model can take input from system tuples, learn from those tuples, and apply observations to the data streams from other tuples.

Figure 1:
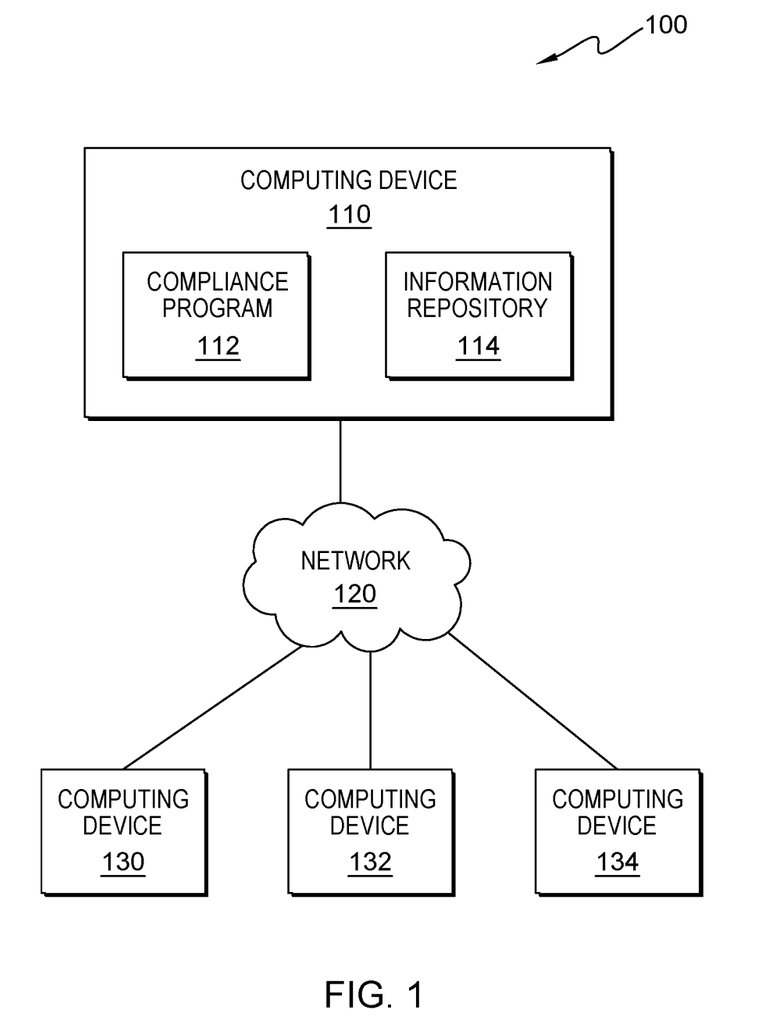
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of compliance program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, computing device 130, computing device 132, and computing device 134, all connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, computing device 130, computing device 132, computing device 134, and other computing devices (not shown) within distributed data processing environment 100.

Computing device 110, computing device 130, computing device 132, and computing device 134, can each be a standalone computing device, a management server, a web server, a mobile computing device, or any other electronic device or computing system capable of receiving, sending, and processing data. In an embodiment, computing device 110, computing device 130, computing device 132, and computing device 134, can each be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110, computing device 130, computing device 132, and computing device 134, can each represent a server computing system utilizing multiple computers as a server system, such as in a cloud computing environment. In yet another embodiment, computing device 110, computing device 130, computing device 132, and computing device 134, each represents a computing system utilizing clustered computers and components (e.g., database server computers, application server computers, etc.) that act as a single pool of seamless resources when accessed within distributed data processing environment 100.

In an embodiment, computing device 110 includes compliance program 112. In an embodiment, compliance program 112 is a program, application, or subprogram of a larger program for predicting software security exploits by monitoring software events. In an alternative embodiment, compliance program 112 may be located on any other device accessible by computing device 110 via network 120.

In an embodiment, computing device 130, computing device 132, and computing device 134 each run software applications being monitored by compliance program 112.

In an embodiment, computing device 110 includes information repository 114. In an embodiment, information repository 114 may be managed by compliance program 112. In an alternate embodiment, information repository 114 may be managed by the operating system of the device, alone, or together with, compliance program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, software design data, software operational data, monitor data, forensic data, operating system data, configuration data, security event data, the AI model, logging of a notification of a security exploit prediction and AI state information related to that notification, and other data that is received by compliance program 112 from one or more sources, and data that is created by compliance program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, a NoSQL database, an object-oriented database, or one or more files.

Figure 2:
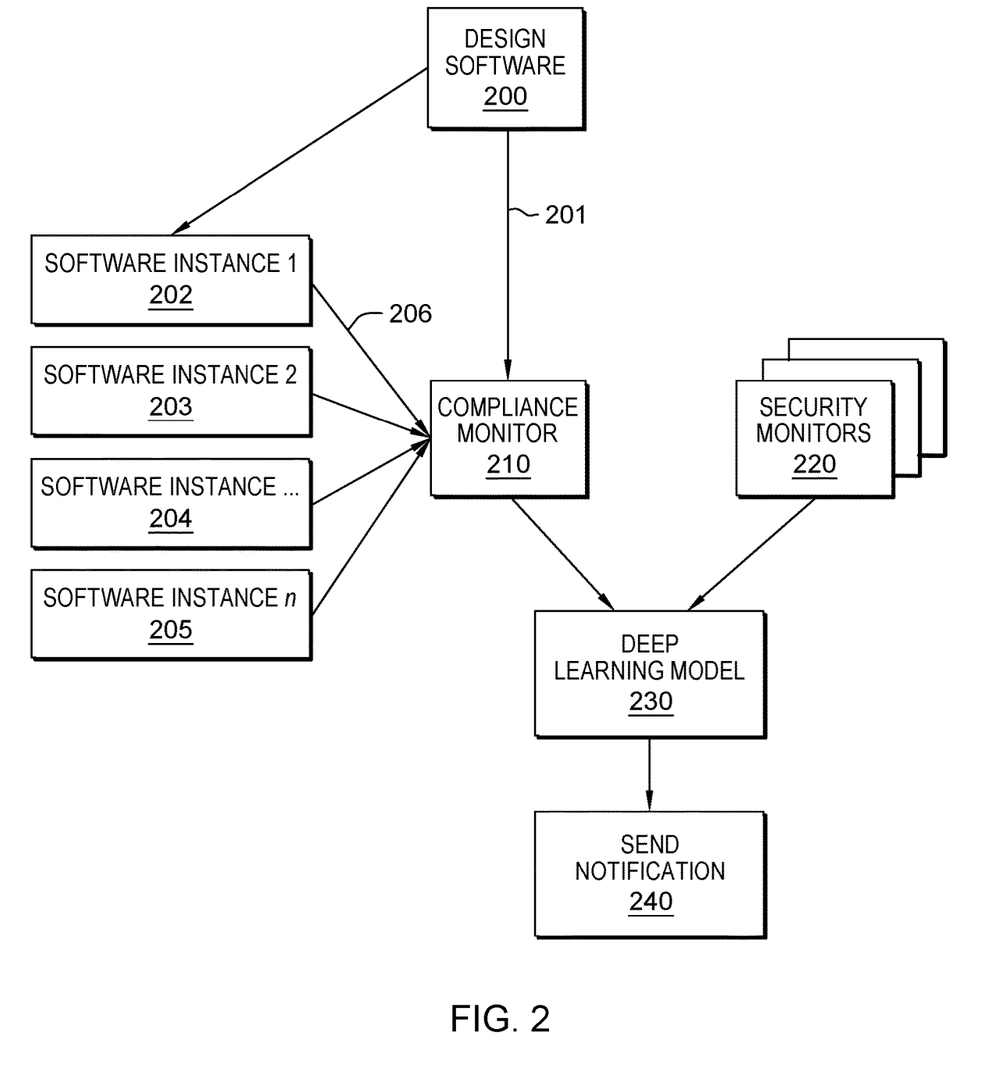
FIG. 2 is an example of the basic functionality of one possible embodiment of the present invention.

FIG. 2 is an example of the basic functionality of one possible embodiment of the present invention. Design software 200 represents the design of the software that is to be monitored by compliance program 112. This is accomplished using standard existing art software design tools. In addition, design software 200 sends actionable elements 201 to compliance monitor 210. Software instance 1 202, software instance 2 203, software instance 3 204, and software instance n 205 represent various instances of software programs generated based on the output of design software 200 that have been deployed and are executing. Each time a software program that was generated based on the output of design software 200 is deployed and executes, the new program instance registers with compliance monitor 210, as shown in FIG. 2 by registration 206.

Compliance monitor 210 is a program that monitors executing instances of software for actions taken by the software. Actions are the design flows of the software design that are generated by the design tools used in design software 200. Compliance monitor 210 monitors the actions of the executing program to determine if the sequences are valid based on the software design. In an embodiment, compliance program 112 receives events from the compliance monitor and inputs the sequence into deep learning model 230 to indicate whether the sequence was valid or invalid.

FIG. 2 also includes security monitors 220. Security monitors 220 watch for and identify various kinds of security exploits. In an embodiment, different types of security exploits are monitored by different security monitors. In an embodiment, the security monitor events include system identification to enable correlation to the software design events. Compliance program 112 receives events from any type of security monitor. The security monitors may include, but are not limited to, an intrusion detection system (a device or software application that monitors a network or systems for malicious activity or policy violations), a network mapper (Nmap—a network scanner that is used to discover hosts and services on a computer network by sending packets and analyzing the responses), and host intrusion detection systems (runs on individual hosts or devices on the network and monitors the inbound and outbound packets and alerts the user or administrator if suspicious activity is detected).

Compliance program 112 detects patterns in the sets of design events received from compliance monitor 210, and inputs these patterns into deep learning model 230. The outputs of security monitors 220 are also fed into deep learning model 230. By combining time sequenced events from the compliance monitor and various security monitors, compliance program 112 gains predictive insight into upcoming security breaches. Deep learning model 230 compares the patterns in the sets of design events to the learned patterns in its database and determines the probability of a security exploit. If compliance program 112 determines that the probability of a security exploit is above a threshold, then compliance program 112 sends notification 240 to the user or the software application itself.

In an embodiment, deep learning model 230 is a trained Recursive Neural Network (RNN) that observes a sequence of software events and predicts a security exploit with the simplistic probability of the precision, recall, and/or F1 score (a standard measure of the accuracy of a test) of the model. In another embodiment, deep learning model 230 is an RNN combined with a Hidden Markov Model (HMM) to increase transparency into the decision process through insight into the probabilities of the HMM states. In another embodiment, deep learning model 230 is the RNN Long Short Term Memory (LSTM) is combined with Hidden Markov Monte Carlo to derive confidence intervals for the prediction. In yet another embodiment, deep learning model 230 uses the scores for Connectionist Temporal Classification (a type of neural network output and associated scoring function for training RNNs) that are used for model feedback to provide insight into the validity of the prediction.

It should be noted that this figure is provided for illustrative purposes only. Many modifications and variations will be apparent to those of ordinary skill in the art without departing from the scope and spirit of the invention.

Figure 3:
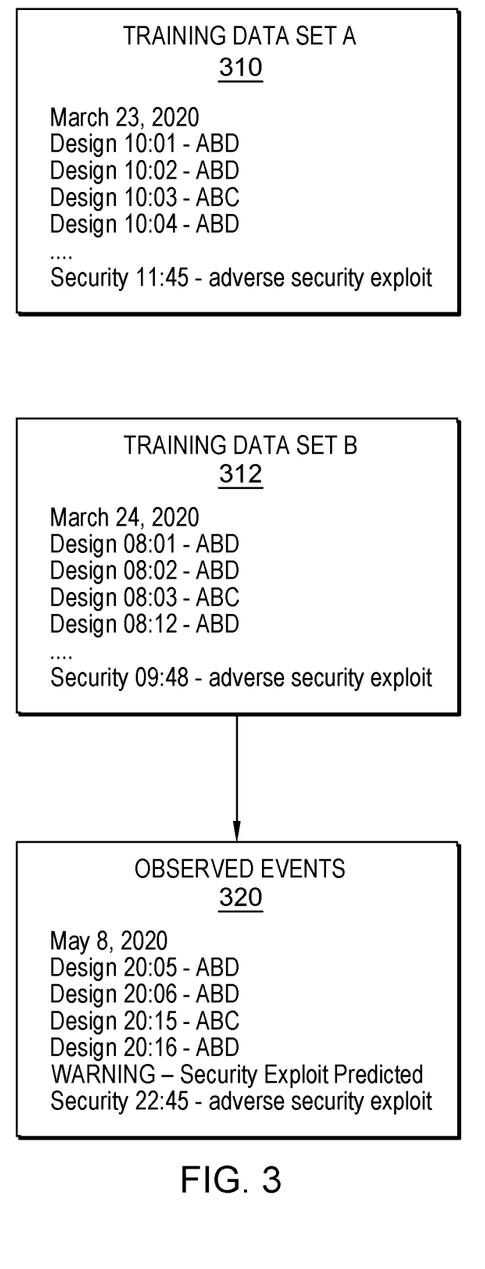
FIG. 3 is a simplified example of predicting that a security exploit will occur, in accordance with an embodiment of the present invention.

FIG. 3 is a simplified example of a detail view illustrating the steps for predicting software security exploits by monitoring software events, in accordance with an embodiment of the present invention. FIG. 3 includes training data set A 310 and training data set B 312. In these two training data sets, the same sequence of software events were logged by the compliance monitor, e.g., compliance monitor 210 of FIG. 2. In this example, the pattern of software events denoted as ABD, ABD, ABC, and ABD, in that specific order, generated an adverse security exploit. It should be noted that it is permissible for there to be event sequences mixed into the order, e.g., ABD, XYZ, ABD, ABC, ABD; the deep leaning model will identify those patterns regardless of the mixing. The provided sequence is for illustration purposes to make it obvious that when a pattern emerges, it is likely to have the same result. The deep learning model, e.g., deep learning model 230 from FIG. 2, learns this pattern. When the deep learning model encounters observed events 320, it detects the same pattern of the actions received from the compliance monitor for the running application, i.e., ABD, ABD, ABC, and ABD, in that specific order. As above, it should be noted that there may be other sequences interleaving this sequence but it is the preceding pattern extracted/identified that triggers the warning. This prevents a hacker from varying the timing of the attack to evade detection. The deep learning model matches this incoming pattern to the learned pattern, and therefore predicts a security exploit. The deep learning model then calculates the probability of the predicted security exploit occurring, and compliance program 112 then determines from the probability whether to take action.

It should be noted that this figure is provided for illustrative purposes only. Many modifications and variations will be apparent to those of ordinary skill in the art without departing from the scope and spirit of the invention.

Figure 4:
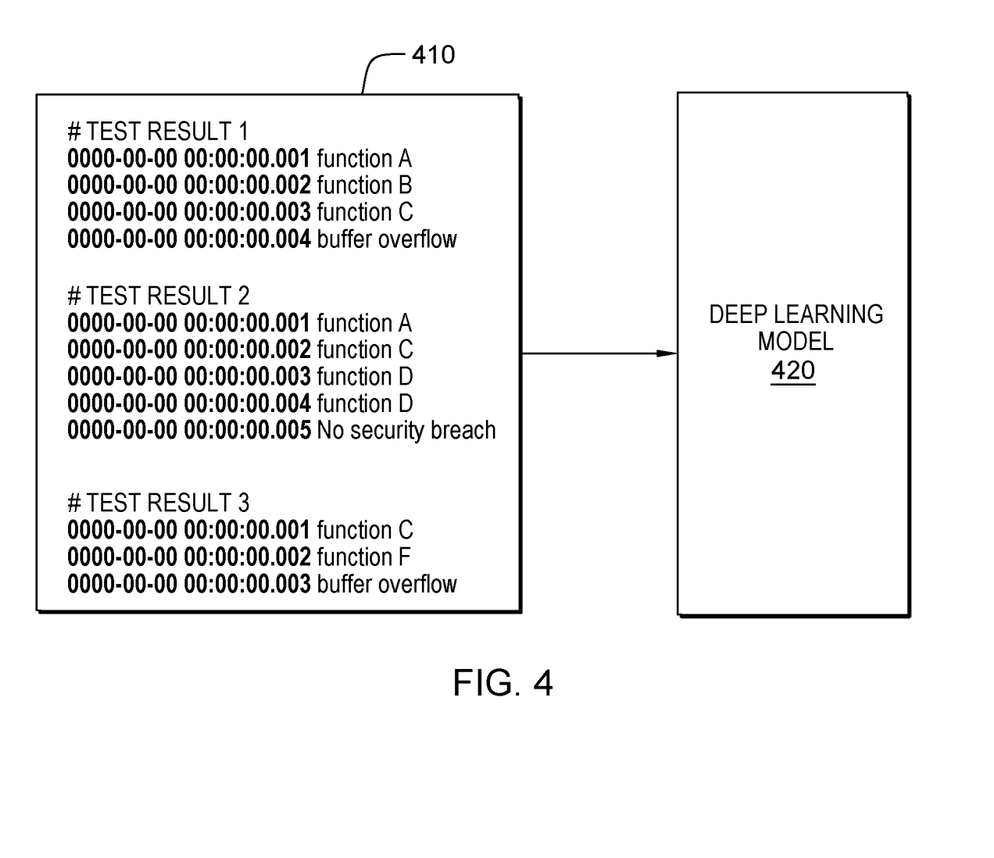
FIG. 4 is an example of training the deep learning model, in accordance with an embodiment of the present invention.

FIG. 4 is an example of training the deep learning model, in accordance with an embodiment of the present invention. FIG. 4 includes test results 410 and deep learning model 420. Test results 410 represents combinations of data, including events from the compliance monitor and the security monitors, that is used to train the deep learning algorithm. In this example, both negative patterns, i.e., those that generate security exploits, and positive patterns, i.e., those that do not generate security exploits, are illustrated. Deep learning model 420 is deep learning model 230 from FIG. 2.

It should be noted that this figure is provided for illustrative purposes only. Many modifications and variations will be apparent to those of ordinary skill in the art without departing from the scope and spirit of the invention.

Figure 5:
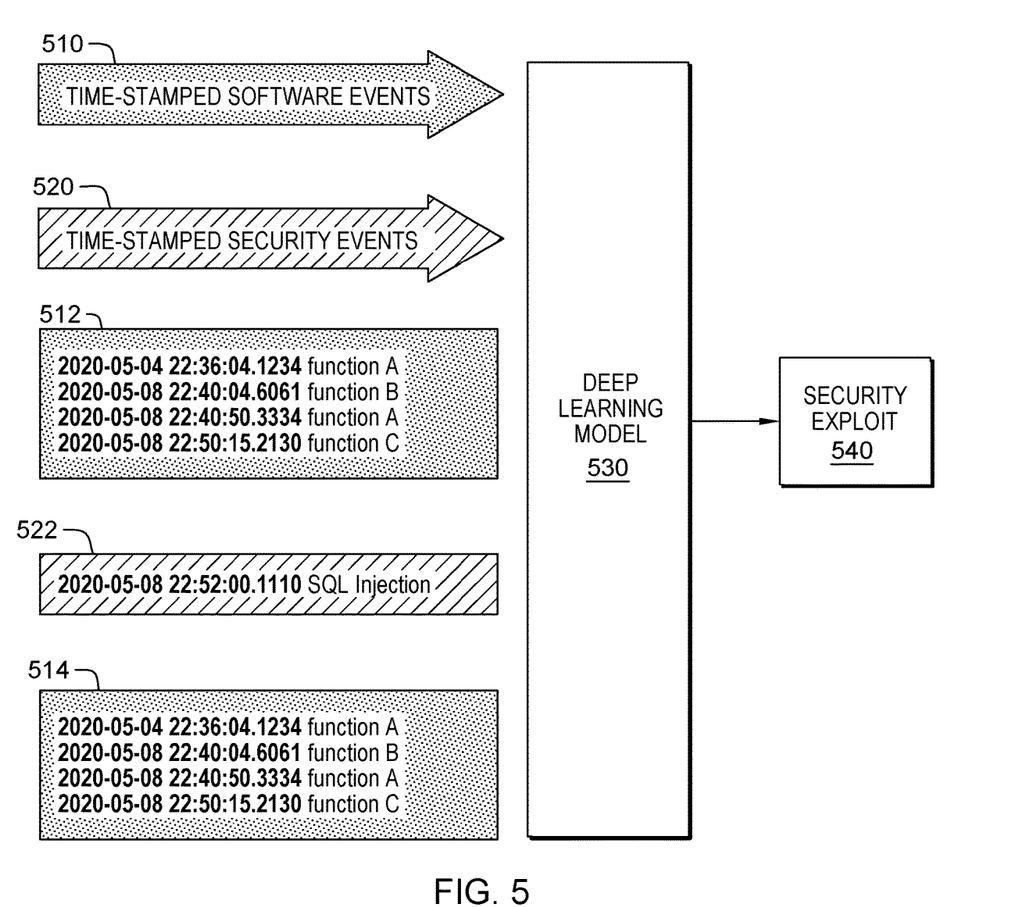
FIG. 5 is an example of the operation of the deep learning model during operation of the compliance program, in accordance with an embodiment of the present invention.

FIG. 5 is an example of the operation of the deep learning model during operation of the compliance program, in accordance with an embodiment of the present invention. In FIG. 5, time-stamped software events 510 and time-stamped security events 520 are input into deep learning model 530. Software events 512 and 514 are examples of the types of events received from the compliance monitor. Security events 522 is an example of the type of events received from the security monitors. During operation, compliance program 112 receives these events from the compliance monitor and the security monitors and inputs them into deep learning model 530. As described above in FIG. 2, deep learning model 530 compares these patterns of events to the learned patterns in its database, and determines the probability of a security exploit. If deep learning model predicts that there will be a security exploit, then deep learning model 530 calculates the probability of the security exploit and creates security exploit prediction notification 540. Compliance program 112 then responds to the notification of a security exploit prediction as discussed above.

It should be noted that this figure is provided for illustrative purposes only. Many modifications and variations will be apparent to those of ordinary skill in the art without departing from the scope and spirit of the invention.

Figure 6:
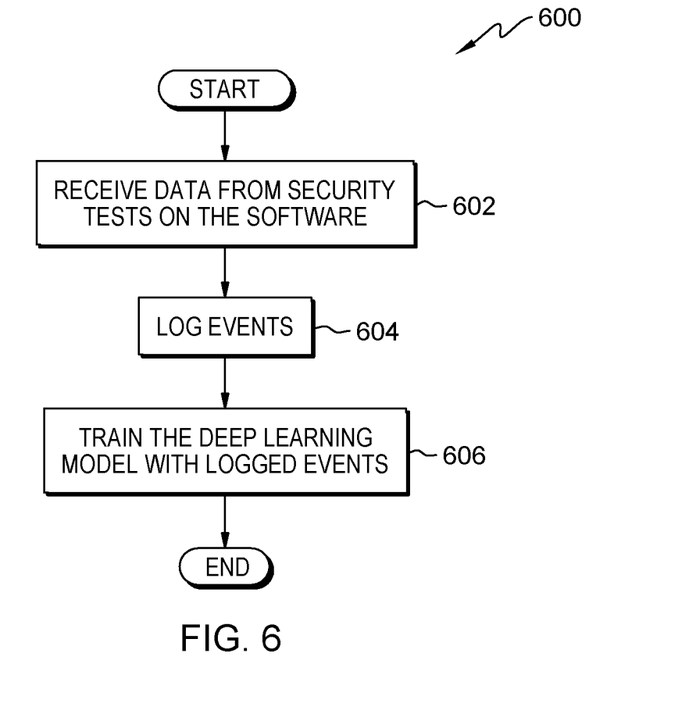
FIG. 6 is a flowchart depicting operational steps for the section of the compliance program that trains the deep learning model, on a computing device within the distributed data processing environment of FIG. 1, for predicting software security exploits by monitoring software events, in accordance with an embodiment of the present invention.

FIG. 6 is a flowchart depicting operational steps for the section of the compliance program that trains the deep learning model, on a computing device within the distributed data processing environment of FIG. 1, for predicting software security exploits by monitoring software events, in accordance with an embodiment of the present invention. In an alternative embodiment, the steps of workflow 600 may be performed by any other program while working with compliance program 112. In an embodiment, compliance program 112 receives the results of security tests previously run on the software. In an embodiment, compliance program 112 logs the security events and the software design events that generated the security events. In an embodiment, compliance program 112 trains the deep learning model with the results of the security tests in the first step.

It should be appreciated that embodiments of the present invention provide at least for predicting software security exploits by monitoring software events. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

Compliance program 112 receives data from the security tests on the software (step 602). In an embodiment, compliance program 112 receives the results of security tests previously run on the software. In an embodiment, the results of security tests previously run on the software include both software design events from the compliance monitor, e.g., compliance monitor 210 from FIG. 2, and security events from the security monitors, e.g., security monitors 220 from FIG. 2.

Compliance program 112 logs events (step 604). In an embodiment, compliance program 112 logs the security exploits and the software design events that generated the security exploits. In an embodiment, by learning the sets of design events that lead to security exploits, e.g., training data set A 310 and training data set B 312 from FIG. 3, and the sets that do not, e.g., software events 512 and 514 from FIG. 5, compliance program 112 can identify exploits further in advance than existing techniques.

Compliance program 112 trains the deep learning model with the logged events (step 606). In an embodiment, compliance program 112 trains the deep learning model with the results of the security tests in step 602. Training of the deep learning model is described in FIG. 4 above.

Figure 7:
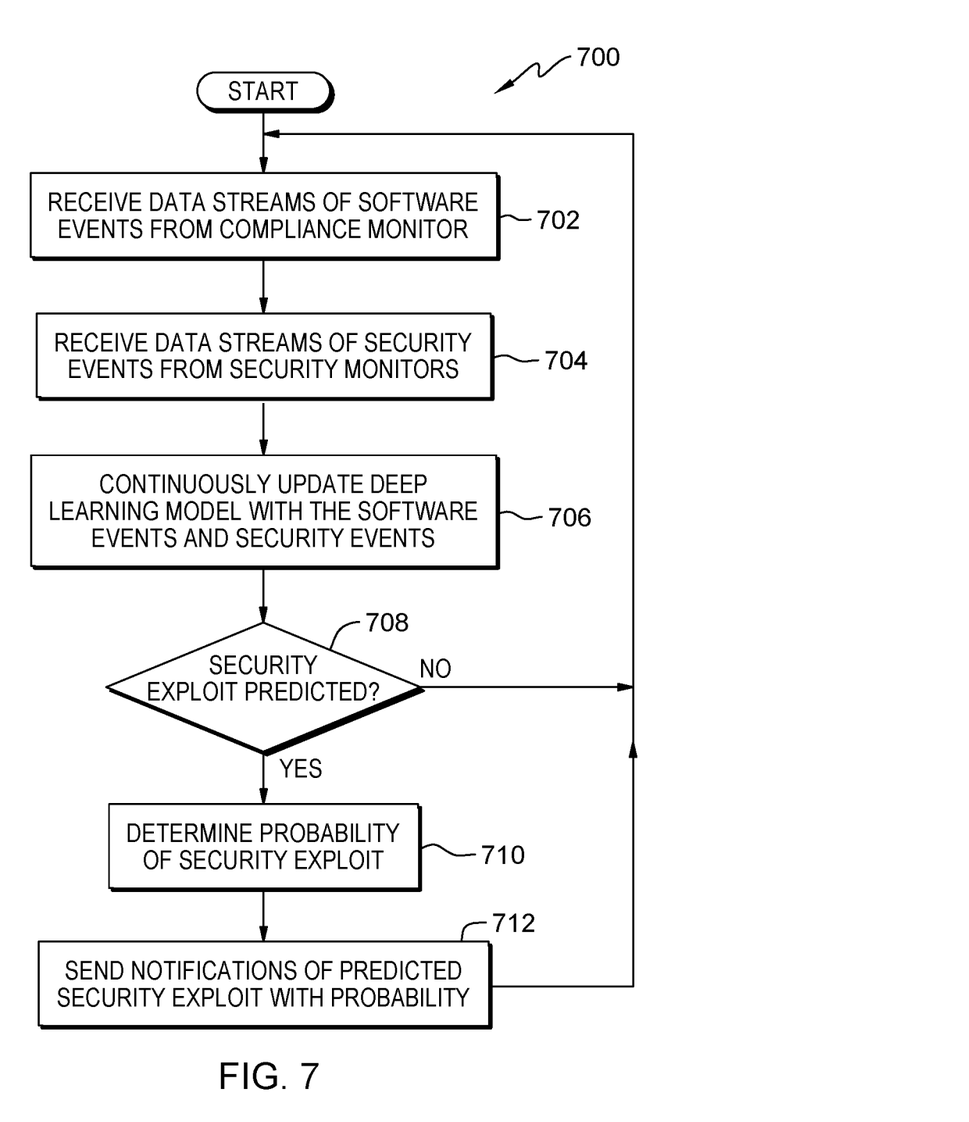
FIG. 7 is a flowchart depicting operational steps for the main section of the compliance program, on a computing device within the distributed data processing environment of FIG. 1, for predicting software security exploits by monitoring software events, in accordance with an embodiment of the present invention.

FIG. 7 is a flowchart depicting operational steps for the main section of compliance program 112, on a computing device within the distributed data processing environment of FIG. 1, for predicting software security exploits by monitoring software events, in accordance with an embodiment of the present invention. In an alternative embodiment, the steps of workflow 700 may be performed by any other program while working with compliance program 112. In an embodiment, compliance program 112 receives data streams of software events for each running software program from the compliance monitor, e.g., compliance monitor 210 from FIG. 2. In an embodiment, compliance program 112 receives data streams from one or more security monitors. In an embodiment, compliance program 112 inputs the live data streams of the software execution from the compliance monitor, e.g., compliance monitor 210 from FIG. 2, and the security events from the security monitors, e.g., security monitors 220 from FIG. 2, to the deep learning model, e.g., deep learning model 230 from FIG. 2. In an embodiment, compliance program 112 determines if the live data streams of the software execution and the security events predict an upcoming security exploit. In an embodiment, if compliance program 112 predicts that there is an upcoming security exploit, then compliance program 112 determines the probability that the predicted security exploit will occur. In an embodiment, compliance program 112 sends an alert to an operator notifying the operator of a predicted security exploit and the probability that the predicted security exploit will occur.

It should be appreciated that embodiments of the present invention provide at least for predicting software security exploits by monitoring software events. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

Compliance program 112 receives data streams of software events from the compliance monitor (step 702). In an embodiment, compliance program 112 receives data streams of software events for each running software program from the compliance monitor, e.g., compliance monitor 210 from FIG. 2.

Compliance program 112 receives data streams of security events from the security monitors (step 704). In an embodiment, compliance program 112 receives data streams from one or more security monitors. In an embodiment, different security monitors watch for and identify different types of security events, since typically not all types of security events are covered by a single security monitor. In an embodiment, compliance program 112 receives events from any type of security monitor.

Compliance program 112 continuously updates the deep learning model with the software events and the security events (step 706). In an embodiment, compliance program 112 inputs the live data streams of the software execution from the compliance monitor, e.g., compliance monitor 210 from FIG. 2, and the security events from the security monitors, e.g., security monitors 220 from FIG. 2, to the deep learning model, e.g., deep learning model 230 from FIG. 2. The model then determines new patterns that predict security exploits, as well as new patterns that do not predict security exploits. In an embodiment, by combining time sequenced events from the compliance monitor and the various security monitors, and adding this data to the deep learning model, compliance program 112 gains predictive insight into upcoming security exploits, as well as patterns that do not predict upcoming security exploits.

Compliance program 112 determines if a security exploit is predicted (decision block 708). In an embodiment, compliance program 112 determines if the live data streams of the software execution and the security events predict an upcoming security exploit. In an embodiment, compliance program 112 determines if the live data streams of the software execution and the security events predict an upcoming security exploit based on a probability calculated by the deep learning model. In an embodiment, if compliance program 112 determines that the probability calculated by the deep learning model exceeds a predetermined threshold, then compliance program 112 determines that a security exploit is predicted. If compliance program 112 determines that the live data streams of the software execution and the security events predict an upcoming security exploit ("yes" branch, decision block 708), then compliance program 112 proceeds to step 710. If compliance program 112 determines that the live data streams of the software execution and the security events do not predict an upcoming security exploit ("no" branch, decision block 708), then compliance program 112 returns to step 702 to continue to receive the data streams.

Compliance program 112 determines the probability of the predicted security exploit (step 710). In an embodiment, if compliance program 112 predicts that there is an upcoming security exploit, then compliance program 112 determines the probability that the predicted security exploit will occur. In an embodiment, a trained Recursive Neural Network (RNN) observes a sequence of software events and predicts a security exploit with the simplistic probability of the precision, recall, and/or F1 score of the model. In another embodiment, the RNN is combined with an HMM to increase transparency into the decision process through insight into the probabilities of the HMM states. In another embodiment, the RNN LSTM is combined with Hidden Markov Monte Carlo to derive confidence intervals for the prediction. In yet another embodiment, the scores for Connectionist Temporal Classification that are used for model feedback, provide insight into the validity of the prediction.

Compliance program 112 sends notifications of the predicted security exploits with probability (decision block 712). In an embodiment, compliance program 112 performs one or more remediations based on the prediction of the upcoming security exploit. In an embodiment, compliance program 112 sends an alert to an operator or a system administrator notifying the operator or system administrator of a predicted security exploit and the probability that the predicted security exploit will occur. In an embodiment, the alert is sent to a system operator. In another embodiment, the alert is sent to any person that is set to receive such alerts as set in system default policies. In an embodiment, compliance program 112 sends a message directly to the software application that caused the security exploit. Compliance program 112 then returns to step 702 to continue to receive the data streams.

Figure 8:
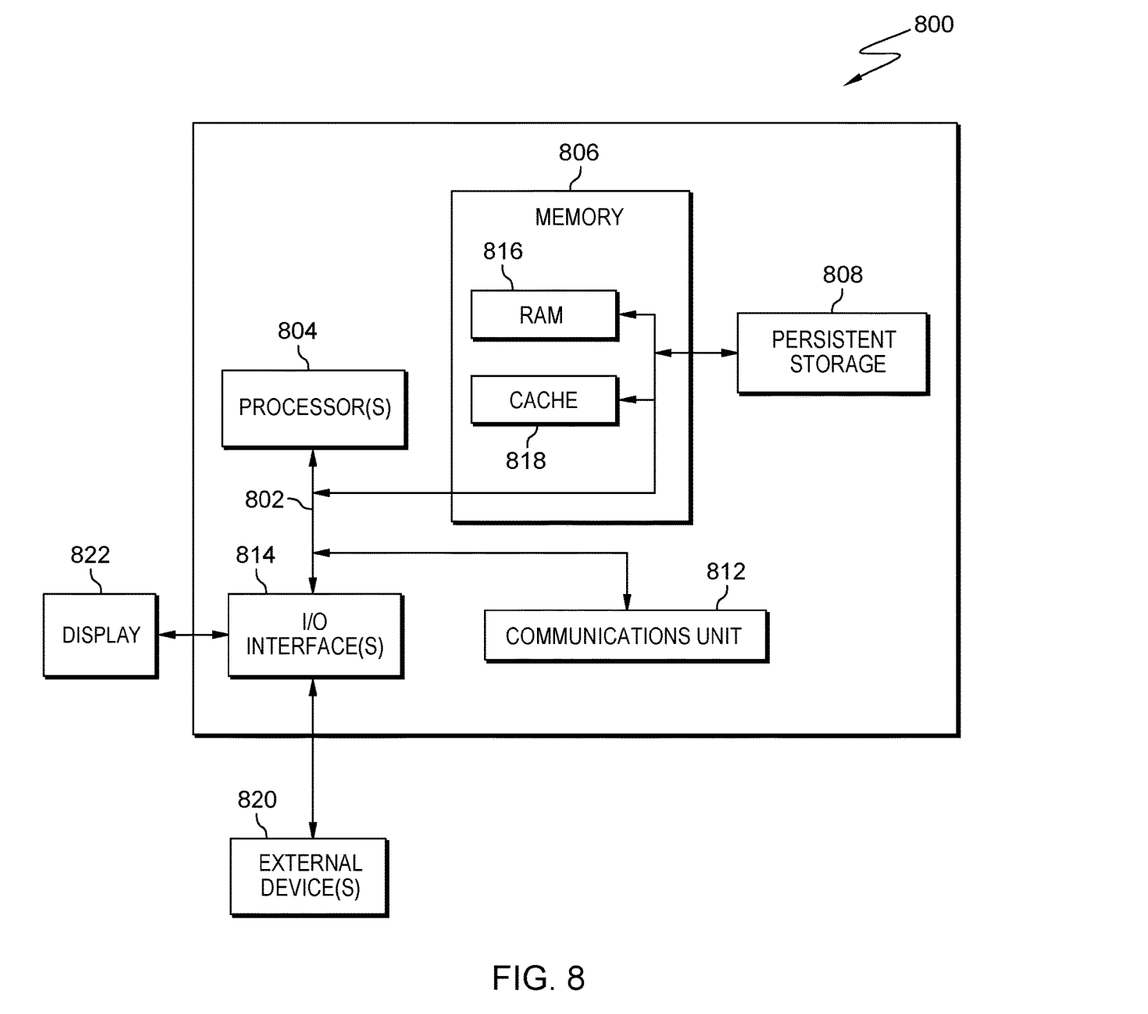
FIG. 8 depicts a block diagram of components of the computing devices executing the compliance program within the distributed data processing environment of FIG. 1, in accordance with an embodiment of the present invention.

FIG. 8 is a block diagram depicting components of computing device 110 suitable for compliance program 112, in accordance with at least one embodiment of the invention.

FIG. 8 displays computer 800; one or more processor(s) 804 (including one or more computer processors); communications fabric 802; memory 806, including random-access memory (RAM) 816 and cache 818; persistent storage 808; communications unit 812; I/O interfaces 814; display 822; and external devices 820. It should be appreciated that FIG. 8 provides only an illustration of one embodiment and does not imply any limitations with regard to the environments in which different embodiments may be implemented. Many modifications to the depicted environment may be made.

As depicted, computer 800 operates over communications fabric 802, which provides communications between computer processor(s) 804, memory 806, persistent storage 808, communications unit 812, and I/O interface(s) 814. Communications fabric 802 may be implemented with any architecture suitable for passing data or control information between processors 804 (e.g., microprocessors, communications processors, and network processors), memory 806, external devices 820, and any other hardware components within a system. For example, communications fabric 802 may be implemented with one or more buses.

Memory 806 and persistent storage 808 are computer readable storage media. In the depicted embodiment, memory 806 comprises RAM 816 and cache 818. In general, memory 806 can include any suitable volatile or non-volatile computer readable storage media. Cache 818 is a fast memory that enhances the performance of processor(s) 804 by holding recently accessed data, and near recently accessed data, from RAM 816.

Program instructions for compliance program 112 may be stored in persistent storage 808, or more generally, any computer readable storage media, for execution by one or more of the respective computer processors 804 via one or more memories of memory 806. Persistent storage 808 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links. In the context of some embodiments of the present invention, the source of the various input data may be physically remote to computer 800 such that the input data may be received, and the output similarly transmitted via communications unit 812.

I/O interface(s) 814 allows for input and output of data with other devices that may be connected to computer 800. For example, I/O interface(s) 814 may provide a connection to external device(s) 820 such as a keyboard, a keypad, a touch screen, a microphone, a digital camera, and/or some other suitable input device. External device(s) 820 can also include portable computer readable storage media such as, for example, thumb drives, portable optical or magnetic disks, and memory cards. Software and data used to practice embodiments of the present invention, e.g., compliance program 112, can be stored on such portable computer readable storage media and can be loaded onto persistent storage 808 via I/O interface(s) 814. I/O interface(s) 814 also connect to display 822.

Display 822 provides a mechanism to display data to a user and may be, for example, a computer monitor. Display 822 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for predicting software security exploits, the computer-implemented method comprising:
   receiving, by one or more computer processors, one or more sets of design events from a compliance monitor, wherein the one or more sets of design events are captured by the compliance monitor during execution of a software application;
   detecting, by the one or more computer processors, a pattern of the one or more sets of design events performed by the software application, wherein the pattern is a specific sequence of the one or more sets of design events;
   comparing, by the one or more computer processors, the pattern of the one or more sets of design events performed by the software application to a database of one or more learned patterns using a deep learning model, wherein the deep learning model is trained with a result of one or more security tests that include design data previously run on the software application; and
   predicting, by the one or more computer processors, a security exploit based on the comparison of the pattern of the one or more sets of design events performed by the software application to the one or more learned patterns.

2. The computer-implemented method of claim 1, wherein the deep learning model is trained with one or more negative patterns and one or more positive patterns, wherein the one or more negative patterns generate one or more security exploits and the one or more positive patterns do not generate the one or more security exploits.

3. The computer-implemented method of claim 1, wherein the deep learning model is continuously updated with at least one of one or more first live data streams of an execution of the software application from the compliance monitor and one or more second live data streams from one or more security monitors.

4. The computer-implemented method of claim 1, wherein predicting the security exploit based on the comparison of the pattern of the one or more sets of design events performed by the software application to the one or more learned patterns further comprises:
   calculating, by the one or more computer processors, a probability that the security exploit will occur; and
   performing, by the one or more computer processors, one or more remediations, wherein the one or more remediations include at least one of sending a notification to a system administrator, alerting a user, and sending a message to the software application.

5. The computer-implemented method of claim 4, wherein the probability that the security exploit will occur is predicted using a model chosen from a group including an F1 score of a Recurrent Neural Network (RNN), an RNN combined with a Hidden Markov Model, an RNN Long Short Term Memory combined with a Hidden Markov Monte Carlo, and an RNN combined with a Connectionist Temporal Classification.

6. The computer-implemented method of claim 1, further comprising:
   training, by the one or more computer processors, the deep learning model with one or more security test results from a plurality of computer systems;
   updating, by the one or more computer processors, the deep learning model with one or more first live data streams of an execution of the software application from the compliance monitor of each computer system of the plurality of computer systems; and
   updating, by the one or more computer processors, the deep learning model with one or more second live data streams from one or more security monitors of each computer system of the plurality of computer systems.

7. The computer-implemented method of claim 6, wherein updating the deep learning model with one or more first live data streams of an execution of the software application from the compliance monitor of each computer system of the plurality of computer systems, further comprises determining, by the one or more computer processors, one or more first new patterns that predict security exploits and one or more second new patterns that do not predict security exploits.

8. A computer program product for predicting software security exploits, the computer-implemented method comprising:
   one or more computer readable storage devices and program instructions stored on the one or more computer readable storage devices, the stored program instructions comprising instructions to:
   receive one or more sets of design events from a compliance monitor, wherein the one or more sets of design events are captured by the compliance monitor during execution of a software application;
   detect a pattern of the one or more sets of design events performed by the software application, wherein the pattern is a specific sequence of the one or more sets of design events;
   compare the pattern of the one or more sets of design events performed by the software application to a database of one or more learned patterns using a deep learning model, wherein the deep learning model is trained with at least a result of one or more security tests that include design data previously run on the software application; and
   predict a security exploit based on the comparison of the pattern of the one or more sets of design events performed by the software application to the one or more learned patterns.

9. The computer program product of claim 8, wherein the deep learning model is trained with one or more negative patterns and one or more positive patterns, wherein the one or more negative patterns generate one or more security exploits and the one or more positive patterns do not generate the one or more security exploits.

10. The computer program product of claim 8, wherein the deep learning model is continuously updated with at least one of one or more first live data streams of an execution of the software application from the compliance monitor and one or more second live data streams from one or more security monitors.

11. The computer program product of claim 8, wherein predict the security exploit based on the comparison of the pattern of the one or more sets of design events performed by the software application to the one or more learned patterns further comprises one or more of the following program instructions, stored on the one or more computer readable storage media, to:
    calculate a probability that the security exploit will occur; and
    perform one or more remediations, wherein the one or more remediations include at least one of sending a notification to a system administrator, alerting a user, and sending a message to the software application.

12. The computer program product of claim 11, wherein the probability that the security exploit will occur is predicted using a model chosen from a group including an F1 score of a Recurrent Neural Network (RNN), an RNN combined with a Hidden Markov Model, an RNN Long Short Term Memory combined with a Hidden Markov Monte Carlo, and an RNN combined with a Connectionist Temporal Classification.

13. The computer program product of claim 8, further comprising one or more of the following program instructions, stored on the one or more computer readable storage media, to:
    train the deep learning model with one or more security test results from a plurality of computer systems;
    update the deep learning model with one or more first live data streams of an execution of the software application from the compliance monitor of each computer system of the plurality of computer systems; and
    update the deep learning model with one or more second live data streams from one or more security monitors of each computer system of the plurality of computer systems.

14. The computer-implemented method of claim 8, further comprising:
    logging the security exploits and the software design events that generated the security exploits.

15. A computer system for predicting software security exploits, the computer system comprising:
    one or more computer processors;
    one or more computer readable storage media; and
    program instructions stored on the one or more computer readable storage media for execution by at least one of the one or more computer processors, the stored program instructions comprising instructions to:
    receive one or more sets of design events from a compliance monitor, wherein the one or more sets of design events are captured by the compliance monitor during execution of a software application;
    detect a pattern of the one or more sets of design events performed by the software application, wherein the pattern is a specific sequence of the one or more sets of design events;
    compare the pattern of the one or more sets of design events performed by the software application to a database of one or more learned patterns using a deep learning model, wherein the deep learning model is trained with at least a result of one or more security tests that include design data previously run on the software application; and
    predict a security exploit based on the comparison of the pattern of the one or more sets of design events performed by the software application to the one or more learned patterns.

16. The computer system of claim 15, wherein the deep learning model is trained with one or more negative patterns and one or more positive patterns, wherein the one or more negative patterns generate one or more security exploits and the one or more positive patterns do not generate the one or more security exploits.

17. The computer system of claim 15, wherein the deep learning model is continuously updated with at least one of one or more first live data streams of an execution of the software application from the compliance monitor and one or more second live data streams from one or more security monitors.

18. The computer system of claim 15, wherein predict the security exploit based on the comparison of the pattern of the one or more sets of design events performed by the software application to the one or more learned patterns further comprises one or more of the following program instructions, stored on the one or more computer readable storage media, to:
    calculate a probability that the security exploit will occur; and
    perform one or more remediations, wherein the one or more remediations include at least one of sending a notification to a system administrator, alerting a user, and sending a message to the software application.

19. The computer system of claim 18, wherein the probability that the security exploit will occur is predicted using a model chosen from a group including an F1 score of a Recurrent Neural Network (RNN), an RNN combined with a Hidden Markov Model, an RNN Long Short Term Memory combined with a Hidden Markov Monte Carlo, and an RNN combined with a Connectionist Temporal Classification.

20. The computer-implemented method of claim 1, further comprising:
    logging, by the one or more computer processors, the security exploits and the software design events that generated the security exploits.

* * * * *